United States Patent
Vaidya et al.

(10) Patent No.: US 9,692,567 B1
(45) Date of Patent: Jun. 27, 2017

(54) TARGETED SERVICE REQUEST FOR SMALL DATA COMMUNICATION IN A NETWORK ENVIRONMENT

(71) Applicant: CISCO TECHNOLOGY, INC., San Jose, CA (US)

(72) Inventors: Maulik Vaidya, Atlanta, GA (US); Vinod K. Kamalaraj, Shirley, MA (US); Pavan Gupta, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 193 days.

(21) Appl. No.: 14/017,886

(22) Filed: Sep. 4, 2013

(51) Int. Cl.
*H04L 5/00* (2006.01)
*H04W 76/02* (2009.01)
*H04W 8/08* (2009.01)

(52) U.S. Cl.
CPC .......... *H04L 5/0037* (2013.01); *H04W 76/02* (2013.01); *H04W 8/08* (2013.01)

(58) Field of Classification Search
CPC . H04W 72/02; H04W 72/022; H04W 72/025; H04W 72/041; H04W 72/042; H04W 88/02; H04W 8/08; H04W 8/02; H04W 8/04; H04W 8/06; H04W 76/04; H04L 5/0007; H04L 5/0037; H04L 65/1016; H04L 65/1073
See application file for complete search history.

(56) References Cited

U.S. PATENT DOCUMENTS

| 2006/0088003 | A1* | 4/2006 | Harris | H04W 76/068 370/329 |
| 2012/0033565 | A1* | 2/2012 | Suh | H04L 63/20 370/252 |
| 2012/0069731 | A1* | 3/2012 | Tooher et al. | 370/221 |
| 2012/0076121 | A1* | 3/2012 | Choi et al. | 370/338 |
| 2012/0269167 | A1* | 10/2012 | Velev et al. | 370/331 |
| 2012/0275401 | A1* | 11/2012 | Sun | H04W 72/04 370/329 |
| 2013/0080597 | A1* | 3/2013 | Liao | H04W 4/005 709/219 |

(Continued)

OTHER PUBLICATIONS

Lien, et al., "Toward Ubiquitous Massive Accesses in 3GPP Machine-to-Machine Communications," IEEE Communications Magazine, Apr. 2011; 9 pages.

*Primary Examiner* — Yemane Mesfin
*Assistant Examiner* — Peter Chen
(74) *Attorney, Agent, or Firm* — Patent Capital Group

(57) ABSTRACT

An example method for targeted service request for small data communication in a network environment is provided and includes receiving an extended service request indicating an evolved packet system (EPS) bearer identity for small data communication over a packet data network connection including one or more EPS bearers, where the one or more EPS bearers includes at least one small data bearer configured for small data communication, selectively activating the small data bearer, and facilitating the small data communication. In specific embodiments, the one or more EPS bearers includes a default EPS bearer and one or more dedicated EPS bearers, where the small data bearer is the default EPS bearer. In other embodiments, the one or more EPS bearers includes a default EPS bearer and one or more dedicated EPS bearers, where the small data bearer is one of the dedicated EPS bearers.

15 Claims, 13 Drawing Sheets

(56) References Cited

U.S. PATENT DOCUMENTS

| | | | |
|---|---|---|---|
| 2013/0083726 A1* | 4/2013 | Jain et al. | 370/328 |
| 2013/0201924 A1* | 8/2013 | Song et al. | 370/329 |
| 2014/0242970 A1* | 8/2014 | Yu | H04W 8/24 455/419 |

* cited by examiner

TARGETED SERVICE REQUEST FOR SMALL DATA COMMUNICATION IN A NETWORK ENVIRONMENT

TECHNICAL FIELD

This disclosure relates in general to the field of communications and, more particularly, to a system and method for targeted service request for small data communication in a network environment.

BACKGROUND

Long Term Evolution (LTE), marketed as 4G LTE, is a standard for wireless communication of high-speed data for mobile phones and data terminals based on the Global System for Mobile Communications (GSM)/Enhanced Data rates for GSM Evolution (EDGE) and Universal Mobile Telecommunications System (UMTS)/High Speed Packet Access (HSPA) network technologies. The LTE and related standards are developed by 3rd Generation Partnership Project (3GPP). LTE uses Evolved Universal Terrestrial Radio Access Network (E-UTRAN) radio access network standard for LTE's air interface system. The 3GPP infrastructure provides wired or wireless connections among communicating intermediate stations, called E-UTRAN nodeBs (eNBs, or eNodeBs). 3GPP is evolving as a promising communication standard for machine-to-machine (M2M) communication, which involves small amount of data communicated among trillions of machine-type communications (MTC) devices. However, the current 3GPP standards may not effectively support efficient resource usage for M2M and other small data communication.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating targeted service request for small data communication in a network environment is provided and includes receiving an extended service request indicating an evolved packet system (EPS) bearer identity for small data communication over a packet data network connection including one or more EPS bearers, where the one or more EPS bearers includes at least one small data bearer configured for small data communication, selectively activating the small data bearer, and facilitating the small data communication. In specific embodiments, the one or more EPS bearers includes a default EPS bearer and one or more dedicated EPS bearers, where the small data bearer is the default EPS bearer. In other embodiments, the one or more EPS bearers includes a default EPS bearer and one or more dedicated EPS bearers, where the small data bearer is one of the dedicated EPS bearers.

EXAMPLE EMBODIMENTS

Figure 1:
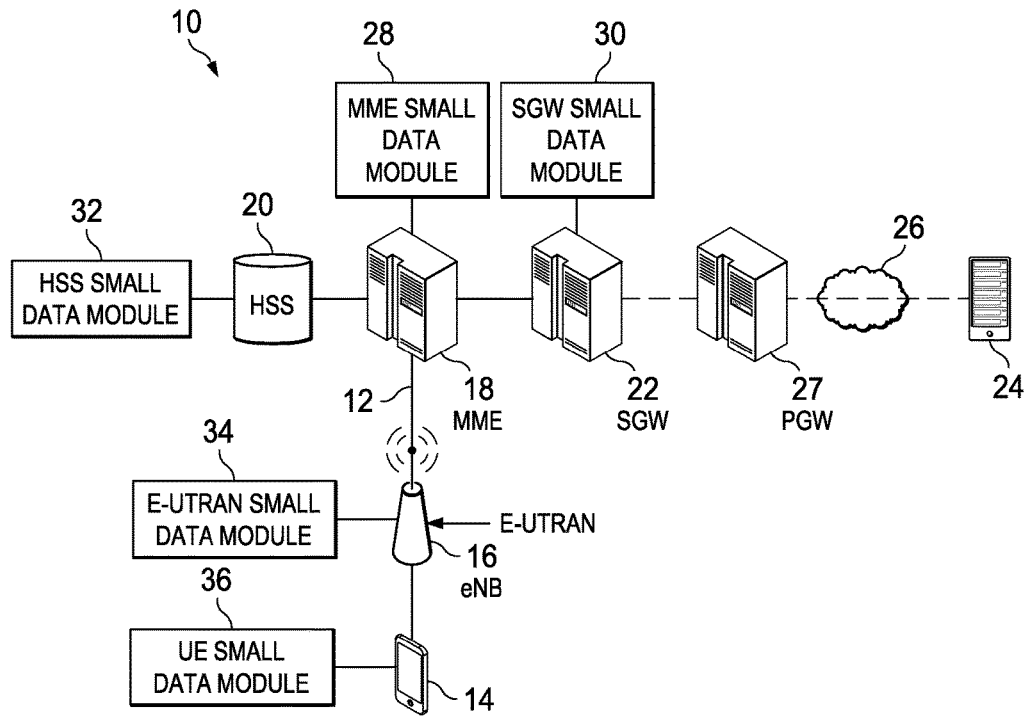
FIG. 1 is a simplified block diagram illustrating a communication system to facilitate targeted service request for small data communication in a network environment according to an example embodiment.

FIG. 1 is a simplified block diagram illustrating an embodiment of communication system 10 for facilitating targeted service request for small data communication in a network environment. Communication system 10 includes a network 12 over which a user equipment (UE) 14 communicates with a eNB 16. eNB 16 may communicate with a mobility management entity (MME) 18, which can access a home subscriber server (HSS) database 20 and a serving gateway (SGW) 22. A server 24 (e.g., or other suitable system component) may communicate with UE 14 across another network (e.g., Internet) 26, via a packet network gateway (PGW) 27 and SGW 22.

According to various embodiments, communication system 10 may facilitate small data communication with various small data modules. For example, MME 18 may be configured with a MME small data module 28; SGW 22 may be configured with a SGM small data module 30; HSS 32 may be configured with a HSS small data module 32, eNB 16 may be configured with a E-UTRAN small data module 34; and UE 14 may be configured with a UE small data module 36.

As used herein, the term "small data" refers to one or more data packets of a communication session that total less than approximately 1000 bytes in size. Small data as used herein can also include data packets of any size communicated infrequently (e.g., once every few hours or days) for a short duration of time (e.g., a few milliseconds to a few seconds). For example, MTC devices may send or receive a small amount of data at possibly a low duty cycle, for short time duration as part of M2M communication.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential implementations.

M2M communication may manifest itself in one of two device types: a) a device (e.g. an earthquake sensor) dedicated for a single M2M application only; or b) a multi-use device (e.g. smartphone) that runs more than one M2M application(s). For case (b), M2M application(s) may require frequent reporting of small amount of data (e.g. temperature at 09:00 was 37 degrees, temperature at 10:00 was 38 degrees etc.). In 4G LTE, user plane communication(s) from UE to the network happens in the context of a PDN connection (associated to an access point name (APN)). The UE can have one or more PDN connection at the same time; for example, PDN#1 for "M2M" APN, PDN#2 for "Internet" APN etc. Irrespective of whether an IDLE mode UE has data to send on one or more PDNs, it is required to perform a SERVICE REQUEST procedure with the network. The procedure assigns Data Radio Bearers (DRBs) to UEs for all PDNs in UE and eNB, and assigns S1-U tunnels from eNB to the SGW. In multi-use devices that send data in the context of an M2M PDN, activating DRBs, and S1-U (and associated RRC, and S1 signaling to set those up) for the other PDNs can be a wasteful use of resources (e.g., processor time, memory space, bearer identities and number, etc.).

In 3GPP, EPS provides Internet Protocol (IP) connectivity between the UE and an external packet data network using E-UTRAN. E-UTRAN includes eNBs that provide the E-UTRA user plane and control plane protocol terminations towards the UE. eNBs performs several functions, such as radio resource management functions (e.g., radio bearer control, radio admission control, connection mobility control, dynamic allocation of resources to UEs in uplink and downlink, etc.); measurement and measurement reporting; IP header compression and encryption of user data stream; scheduling and transmission of paging messages originating from the MME; etc. The MME typically hosts functions such as packet data network gateway (PGW) and SGW selection; authentication; bearer management (including dedicated bearer establishment); idle mode UE tracking; etc. SGW typically performs various functions, such as mobility anchoring for inter-3GPP mobility; E-UTRAN idle mode downlink packet buffering; lawful interception; packet routing and forwarding; etc. The HSS is a central database that typically contains user-related and subscription-related information. The functions of the HSS include mobility management, call and session establishment support, user authentication and access authorization.

Non-radio signaling between the UE and the MME for E-UTRAN access may be carried using a set of protocols called Non-Access Stratum (NAS). The NAS procedures are grouped in two categories: the EPS Mobility Management (EMM), and the EPS Session Management (ESM). The EPS Mobility Management protocol refers to procedures related to mobility over an E-UTRAN access, authentication and security. EMM specific procedures are generally UE-initiated. The EMM procedures define attach/detach (to/from the EPC) mechanisms and other mechanisms to update the location of the UE within the network. EMM connection management procedures provide several functions to support the connection of the UE to the network such as, service request (e.g., initiated by the UE to start the establishment of NAS signaling connection); paging (e.g., initiated by the network in case of downlink NAS signaling to indicate to the UE to start a service request); etc.

The purpose of a service request is to transfer an EMM mode from EMM-IDLE to EMM-CONNECTED and establish appropriate communication links. The service request is typically used when the network has downlink signaling pending; the UE has uplink signaling pending; the UE or the network has user data pending and UE is in the EMM-IDLE mode; the UE in EMM-IDLE or EMM-CONNECTED mode has requested to perform mobile originating/terminating circuit switched (CS) fallback; the network has downlink Cdma2000® signaling pending; or the UE has uplink Cdma2000® signaling pending. The service request procedure is an all-or-nothing proposition in establishing the virtual connections ("bearers"). Currently, the service request procedure does not allow selective establishment of bearers.

The UE may send an extended service request to the network to initiate a "CS fallback or 1×CS fallback call" or respond to an "MT CS fallback or 1×CS fallback" request from the network. The extended service request is also generally used if the UE wants to request establishment of a NAS signaling connection for packet services with additional information that cannot be provided via a regular service request message.

The EPS Session Management protocol offers support to the establishment and handling of user data in the NAS. In EPS, the IP connectivity between the UE and a packet data network (PDN) can be described by a PDN connection and an EPS bearer. As used herein, the term "EPS bearer" refers to a virtual connection between two endpoints (e.g. UE and PGW) in EPS. The EPS bearer can include an encapsulation of data packets transmitted between the two end points, and can provide transport service with specific quality of service (QoS) attributes. The EPS Bearer can be established by an EPS Bearer Activation procedure. During the EPS Bearer Activation procedure, edge nodes and intermediate nodes (e.g., SGW, PGW) in EPS may be selected; tunnels may be established between the participating nodes; the forwarding tables may be configured; classification rules may be configured; and QoS resources may be reserved in participating interfaces. A specific EPS bearer may be identified by its EPS bearer identity (EBI), a one-half octet component of the EPS header. For example, a L3 protocol may define bits 5 to 8 of octet 1 of a standard L3 message to comprise the EBI. The EBI can be used to identify a message flow.

The PDN connection comprises a default EPS bearer and possibly additional EPS bearers called "dedicated bearers." The default bearer is created upon establishment of the PDN connection. If a service (e.g. video streaming) requires specific handling in terms of quality of service (QoS), dedicated bearers can be established. Within the PDN connection, all EPS bearers share a same UE IP address and an Access Point Name (APN). EPS supports multiple simultaneous PDN connections. For instance, a UE can have a first PDN connection to the Internet (e.g., with a default EPS bearer) and a second PDN connection to the operator's Instant Message Service (IMS) (with additional dedicated bearers, if required by the service).

Each EPS bearer context represents an EPS bearer between the UE and the PDN. EPS bearer contexts can remain activated even if the radio bearers and S1 bearers constituting the corresponding EPS bearers between the UE and the MME are temporarily released. The EPS bearer context can be either a default bearer context or a dedicated bearer context. The default EPS bearer context is activated when the UE requests a connection to a specific PDN. The first default EPS bearer context is activated during the EPS attach procedure. Additionally, the network activates several dedicated EPS bearer contexts in parallel. The default EPS bearer context remains activated throughout the lifetime of the UE's connection to the PDN.

For example, the UE may comprise a smart phone engaged in a PDN connection sending voice data (e.g., phone call), and e-mail. The voice data may be carried in one EPS bearer, and the e-mail data may be carried in another EPS bearer. Assume that the smart phone goes into idle mode, loses radio connectivity, and subsequently requests reattachment to the network. When the smart phone reattaches to the network, both EPS bearers are reactivated irrespective of whether voice data and/or e-mail data is being communicated by the smart phone. Thus, there is inefficient usage of resources (e.g., bearer resources, device memory, etc.) when the UE is reactivated from idle mode. Such inefficient use of resources may be compounded in a small data communication scenario.

3GPP also provides for small data communication in the form of M2M communication between MTC devices in a 3GPP network. Mechanical automation (e.g., smart grid) may be achievable among MTC devices using M2M communication. For example, a sensor network may be represented as a M2M network, where the sensors measure certain physical quantities and transfer the measured values to a decision maker (e.g., a computer) over a network (e.g., Internet). However, in 3GPP infrastructure, a major challenge to M2M communication lies in the air interface of the network. To meet requirements of fourth generation (4G) wireless systems, 3GPP is typically configured to support high peak data rate for human-to-human (H2H) communications. However, small data communication is fundamentally different from H2H communications, as small data communication involves infrequent short bursts of small amount of data from trillions of MTC devices. Therefore, typical network and device configurations for high data rate transmissions may not efficiently support small data communication.

Moreover, resource (e.g., bandwidth, memory, etc.) management may be materially different between high peak data rate communication and small data communication in 3GPP networks. For example, when the UE switches from idle to connected mode, substantially all EPS bearers for that UE's attachment lifetime are activated, whether or not they are in use in the connected mode. Activating all EPS bearers can lead to ineffective and inefficient over-use of memory resources on the UE, eNB and SGW (among other network elements).

Communication system 10 is configured to address these issues (and others) in offering a system and method for targeted service request for small data communication in a network environment. According to embodiments of communication system 10, MME 18 can receive an extended service request forwarded by eNB 16, indicating an EBI for small data communication over a PDN connection. As used herein, the term "extended service request" comprises a specific type of service request initiated (e.g., invoked, started, generated, etc.) by UE 14 to start establishment of a NAS signaling connection for small data communication.

The PDN connection can comprise one or more EPS bearers, including at least one small data bearer configured for small data communication. MME 18 may decide, based on subscription permissions and/or other appropriate information that indicates small data permission, to mark a particular PDN connection or EPS bearer as "small data" enabled, and subsequently allow selective activation of such EPS bearer(s). MME 18 may selectively activate only the small data bearer (e.g., to the exclusion of other EPS bearers), and facilitate the small data communication with UE 14 and SGW 20 (among other network elements). As used herein, the term "small data bearer" includes an EPS bearer configured for small data communication. Small data bearer can refer to a default EPS bearer or a dedicated EPS bearer that is configured to carry small data.

According to various embodiments, when the small data bearer is the default EPS bearer, no other EPS bearers may be activated. When the small data bearer is one of the dedicated EPS bearers, MME 18 may activate the default EPS bearer in addition to the small data bearers. Substantially no other EPS bearers may be activated. Activating the EPS bearer may comprise setting a MM context for the EBI and modifying a bearer request to SGW 22 to include only the specific EPS bearer (e.g., small data bearer) indicated in the extended service request. MME 18 may enhance the MM context to include an active or inactive status of the EBI. In some embodiments, UE 14 may know that it may need a non-small data capable bearer only for a short time, in which case, depending on operator policy, MME 18 may grant selective activation of such requested EPS bearer(s).

MME 18 may determine whether small data communication is allowed by UE 14 on the specific EPS bearer and if allowed (and UE 14 is authenticated), the small data may be enabled on the PDN connection. In one embodiment, MME 16 may use subscription permission in HSS 20 on a per APN basis and a per International Mobile Subscriber Identity (IMSI) basis to authorize small data communication by UE 14. In another embodiment, MME 16 may authorize small data communication by UE 14 using subscription permission in a local configuration. Subsequently, if MME 16 receives a service request from UE 14 for non-small data communication (e.g., communication of data that is not small data), MME 16 may activate substantially all EPS bearers. According to some embodiments, a mobile terminated (MT) communication (e.g., originating from UE 24) for an idle mode UE may be received at MME 18 from SGW 22. Since substantially all downlink communication occurs within the context of an EBI, the downlink data communication from SGW 22 may indicate an EBI for small data communication. MME 18 may transmit a paging message to eNB 16, with the paging message including the EBI.

Turning to the infrastructure of communication system 10, the network topology can include any number of UEs, eNBs, MMEs, SGWs, HSSs, servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic and wireless (e.g., radio, microwave, etc.) communications.

Additionally, any one or more of these elements may be combined or removed from the architecture based on particular configuration needs. Communication system 10 may include a configuration capable of UDP/IP communications for the electronic transmission or reception of data packets in the network or a portion thereof. Communication system 10 may also operate in conjunction with a TCP/IP or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Communication system 10 can include any number of computer systems 12, switches, server load balancers and other network elements within the broad scope of the embodiments.

The example network environment or a portion thereof may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, Infiniband, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, HSS 20 can include any type of storage element, memory, database, repository, hard drive, or any other appropriate mechanism for storing data in the context of the small data communication activities discussed herein. eNB 16, MME 18, SGW 22 and PGW 27 may include suitable network elements configured to perform the small data operations and other 3GPP functionalities described herein. As used herein, the term "network element" is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. UE 14 may include any type of device capable of communicating with eNB 16, including smart phones, laptops, tablets, sensors, servers, and appliances.

According to various embodiments, MME small data module 28 comprises an application executing in MME 18 and configured to support (e.g., perform, facilitate) various functions, such as small data capability exchange with UE 14 and SGW 22; small data allowed permission on a per-IMSI or per-IMSI and per-APN basis; treatment of Extended Service Request including EBI(s); and enhancement of the MM context with the bearer status (e.g., ACTIVE/INACTIVE) per EBI. SGW small data module 30 comprises an application executing in SGW 22 and configured to support various functions, such as small data capability exchange with MME 18; and enhancement of the EPS Bearer context with the bearer status (e.g., ACTIVE/INACTIVE) per EBI. HSS small data module 32 comprises an application executing in HSS 20 (or a server associated therewith), and configured to support various functions including small data allowed permission on per-IMSI or per-IMSI-and-per-APN basis. E-UTRAN small data module 34 comprises an application executing in eNB 16 and configured to support various functions, including handling of paging messages that include the EBI. UE small data module 36 comprises an application executing in UE 14 and configured to support various functions, including small data capability exchange with MME 18; treatment of Extended Service Request including EBI(s); enhancement the MM context with bearer status (e.g., ACTIVE/INACTIVE) per EBI; and handling of paging messages that include the EBI.

Figure 2:
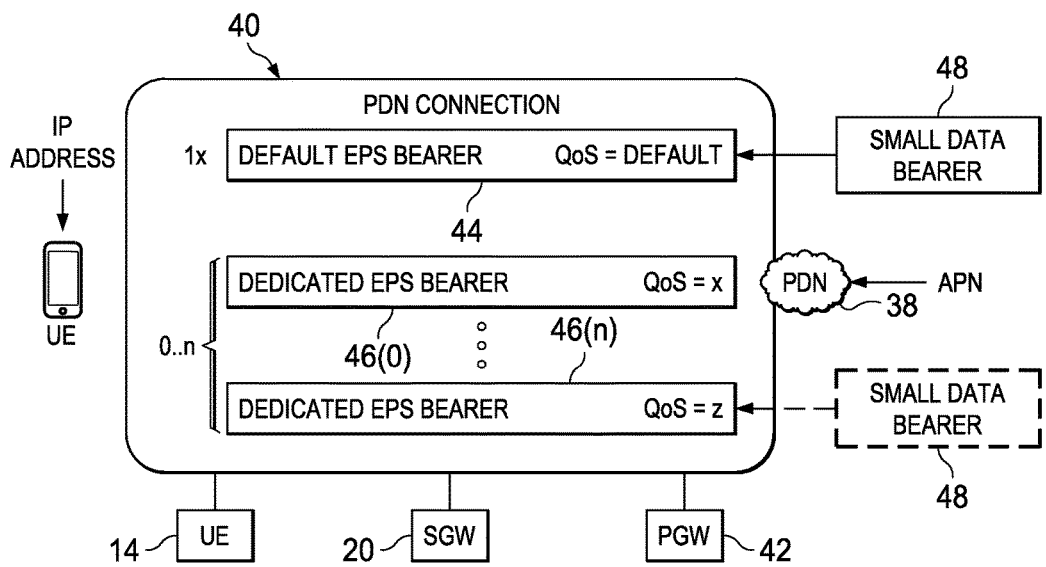
FIG. 2 is a simplified block diagram illustrating example details of the communication system in accordance with one embodiment.

FIG. 2 is a simplified block diagram illustrating example details of an example PDN connection according to an embodiment of communication system 10. UE 14 may connect to a PDN 38 over a PDN connection 40. UE 14 may be identified by an IP address, and PDN 38 may be accessed through an appropriate APN. PDN connection 40 may span across SGW 20 and a PGW 42. PDN connection 40 may comprise one or more EPS bearers. For example, PDN connection may include a default EPS bearer 44 and one or more dedicated EPS bearers 46(0)-46(n). In some embodiments, default EPS bearer 44 may comprise a small data bearer 48 (e.g., configured to carry small data exclusively). In other embodiments, one or more of dedicated EPS bearers 46(0)-46(n) may comprise small data bearer 48.

Figure 3:
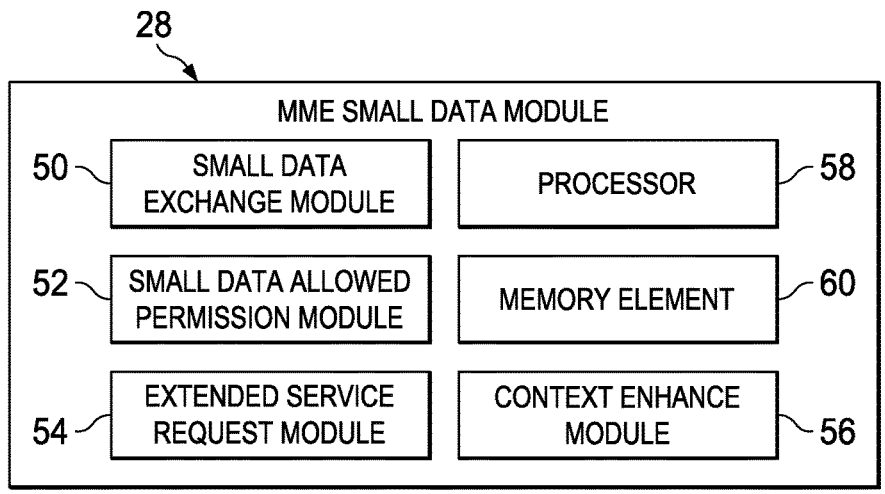
FIG. 3 is a simplified block diagram illustrating other example details of the communication system in accordance with one embodiment.

FIG. 3 is a simplified block diagram illustrating example details of an example MME small data module 28 according to an embodiment of communication system 10. MME small data module 28 may include a small data exchange module 50, a small data allowed permission module 52, an extended service request module 54, a context enhance module 56, a processor 58, and a memory element 60. Small data exchange module 50 may facilitate exchange of small data with UE 14 and SGW 22 over appropriate small bearers. Small data allowed permission module 52 may query (e.g., access and seek, locate, etc.) HSS 20 or local configuration files to determine whether small data is allowed for the requested PDN connection from UE 14. Extended service request module 54 may be configured to recognize extended service requests including the EBI indicating small bearer.

Context enhance module 56 may facilitate enhancing the MM context per EBI with an active/inactive status. When UE 14 uses a targeted service request procedure according to the operations described herein, EBIs other than the one for which bearer activation was requested, can remain as inactive in UE 14, MME 18, and SGW 22. EPS Bearer Contexts in UE 14, MME 18 (stored as MM Context), and SGW 22 (stored as EPS Bearer Context) may be enhanced to indicate its status as either ACTIVE or INACTIVE. ACTIVE status can imply that the referenced EBI is usable for user data transmission. An INACTIVE status can imply that the referenced EBI requires either Service Request or Targeted Service Request procedure prior to it being useable. During mobility procedures (e.g., IDLE mode via Context Transfer Request procedure or CONNECTED mode via Forward Relocation Request procedure), MME 18 can notify a peer MME about the state of each EBI to allow appropriate handling of future Service Request or Targeted Service Request procedures from UE 14. Processor 58 and memory element 60 may facilitate the operations described herein.

Figure 4:
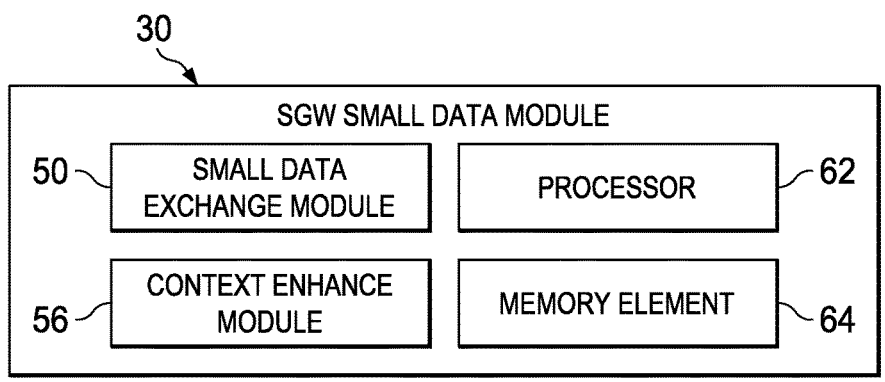
FIG. 4 is a simplified block diagram illustrating other example details of an embodiment of the communication system.

FIG. 4 is a simplified block diagram illustrating example details of an example SGW small data module 30 according to an embodiment of communication system 10. SGW small data module 30 may include small data exchange module 50, context enhance module 56, a processor 62, and a memory element 64. Small data exchange module 50 may facilitate exchange of small data with MME 18 over appropriate small bearers. Context enhance module 56 may facilitate enhancing the EPS context per EBI with an active/inactive status. Processor 62 and memory element 64 may facilitate the operations described herein.

Figure 5:
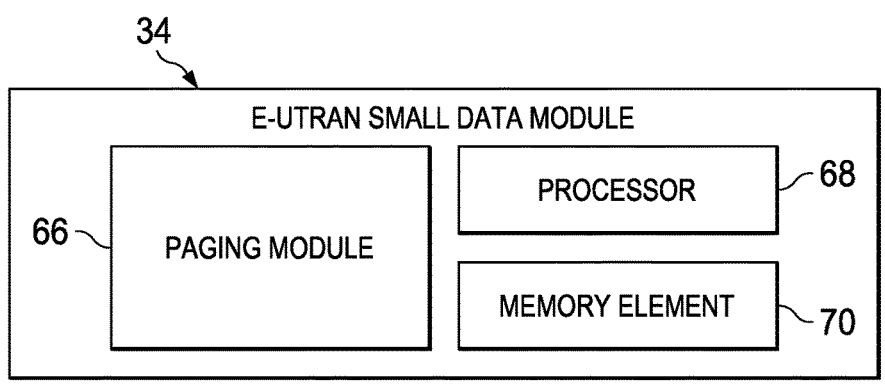
FIG. 5 is a simplified block diagram illustrating further example details of an embodiment of the communication system.

FIG. 5 is a simplified block diagram illustrating example details of an example E-UTRAN small data module 34 according to an embodiment of communication system 10. E-UTRAN small data module 34 may include a paging module 66, a processor 68, and a memory element 70. Paging module 66 may facilitate sending and receiving paging messages including EBIs indicating small data bearers. Processor 68 and memory element 70 may facilitate the operations described herein.

Figure 6:
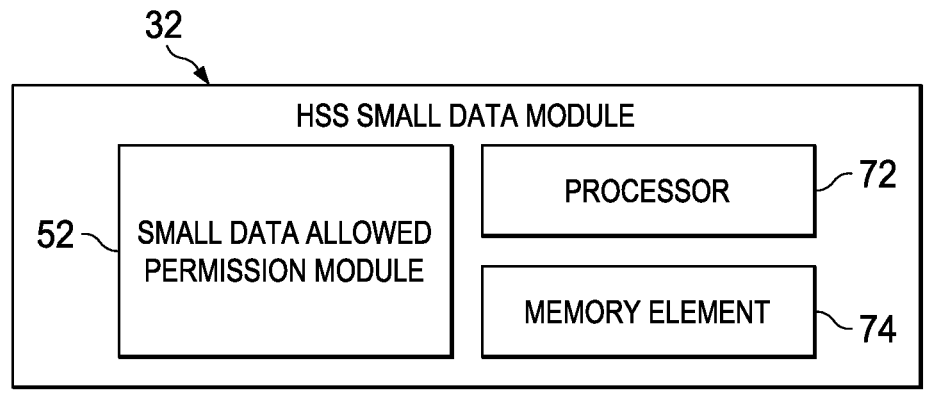
FIG. 6 is a simplified block diagram illustrating further example details of an embodiment of the communication system.

FIG. 6 is a simplified block diagram illustrating example details of an example HSS small data module 32 according to an embodiment of communication system 10. HSS small data module 32 may include small data allowed permission module 52, a processor 72, and a memory element 74. Small data allowed permission module 52 may receive queries from MME 18 to determine whether small data is allowed for the requested PDN connection from UE 14. Small data allowed permission module 52 may support small data allowed permission on per-IMSI or per-IMSI and per-APN basis. In case of a change in subscription permission with respect to small data (e.g. when permission for "small data allowed" allowed APN for a given IMSI is revoked) HSS small data module 32 may execute a subscriber initiated QoS modification indicating the changed permission(s). Processor 72 and memory element 74 may facilitate the operations described herein.

Figure 7:
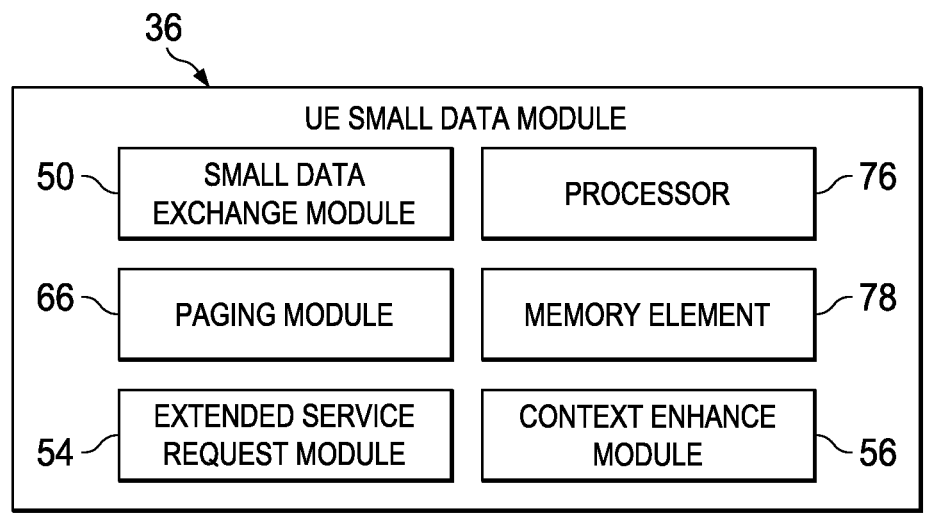
FIG. 7 is a simplified block diagram illustrating further example details of an embodiment of the communication system.

FIG. 7 is a simplified block diagram illustrating example details of an example UE small data module 36 according to an embodiment of communication system 10. UE small data module 36 may include small data exchange module 50, extended service request module 54, context enhance module 56, paging module 66, a processor 76, and a memory element 78. Small data exchange module 50 may facilitate exchange of small data with MME 18 over appropriate small bearers. Extended service request module 54 may be configured to generate extended service requests including the EBI indicating small bearer. Context enhance module 56 may facilitate enhancing the MM context per EBI with an active/inactive status. Paging module 66 may facilitate sending and receiving paging messages including EBIs indicating small data bearers. Processor 76 and memory element 78 may facilitate the operations described herein.

Figure 8:
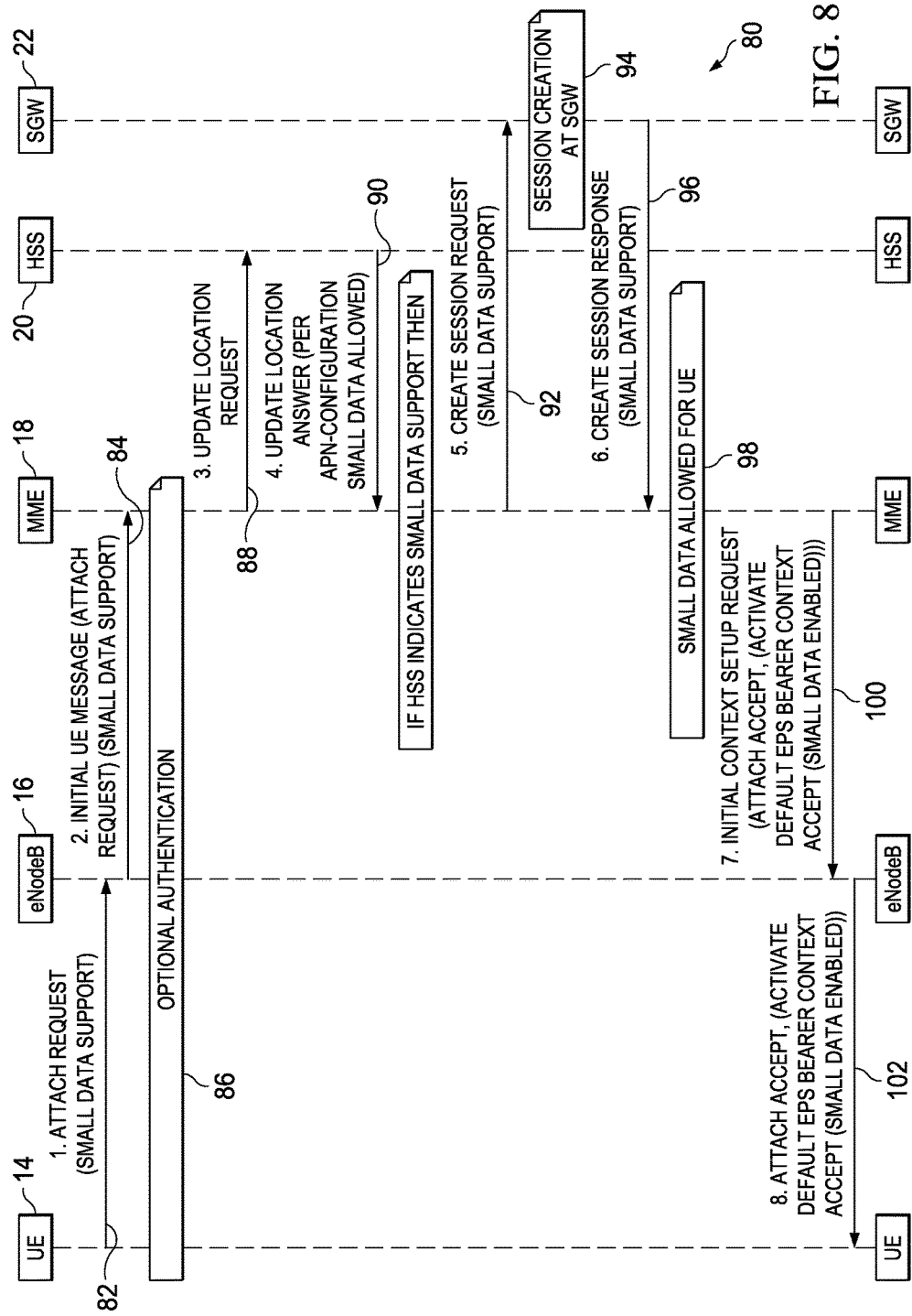
FIG. 8 is a simplified sequence diagram illustrating an example sequence of potential operations of an embodiment of the communication system.

FIG. 8 is a simplified sequence diagram illustrating an example operational sequence 80 for an initial targeted request process according to an embodiment of communication system 10. For a given UE 14's attachment to network 12, small data support is considered enabled for the EPS bearer(s) if UE 14, MME 18 and SGW 22 support the small data capability and MME 18 allows use of the EPS bearer(s) for small data communication. According to various embodiments, UE 14 may indicate small data support in a UE NETWORK CAPABILITY Information Element (IE) of an ATTACH (or tracking area update (TAU)) REQUEST. MME 18, which comprises MME small data module 28, may include a small data support IE in a CREATE SESSION REQUEST (e.g., for ATTACH and TAU with a SGW change) or a MODIFY BEARER REQUEST (e.g., for TAU without SGW change) message. SGW 18 supporting the small data communication may respond with a small data support IE in the CREATE SESSION RESPONSE or MODIFY BEARER RESPONSE. In some embodiments, MME 18 may indicate to UE 14 which PDN connection(s) are small data enabled for the duration of the attachment in a ATTACH or TAU ACCEPT message. Subsequently, the use of a Targeted Service Request procedure is considered allowed.

At 82, when UE 14 with small data capability performs an ATTACH REQUEST with network 12, UE 14 may indicate support for small data capability via a small data support in the UE NETWORK CAPABILITY IE of the ATTACH request. At 84, eNB 16 may forward the ATTACH REQUEST in an S1 INITIAL UE MESSAGE to MME 16. At 86, an optional authentication procedure may be performed. At 88, MME 18 may send an UPDATE LOCATION REQUEST to HSS 20. In some embodiments, if subscription data indicates support for small data for the IMSI for default APN (e.g., via APN-Configuration attribute value pairs (AVP)), HSS 20 may respond at 90 with an UPDATE LOCATION RESPONSE indicating that the APN-Configuration allows small data. In other embodiments, if subscription data indicates support for small data for the IMSI and particular APN(s), HSS 20 may respond with an UPDATE LOCATION RESPONSE indicating that the APN-Configuration allows small data.

At 92, if the HSS response indicates that small data is allowed for the APN(s), at 92, MME 18 may send a small data support IE in a CREATE SESSION REQUEST to SGW 22. At 94, SGW 22 may proceed with establishing a PDN according to 3GPP standards. At 96, SGW 22 may send a CREATE SESSION RESPONSE with a small data support IE. Inclusion of the small data support IE can imply that SGW 22 has successfully created the PDN connection and is ready to apply the small data functionality on the PDN connection. At 98, MME 18 may have sufficient information to enable per-EBI support for small data. At 100, MME 18 may indicate small data enablement to UE 14 in an in ATTACH ACCEPT (ACTIVATE DEFAULT EPS BEARER CONTEXT REQUEST (small data enabled)) message. At 102, eNB 16 may forward the ATTACH ACCEPT message to UE 14.

Figure 9:
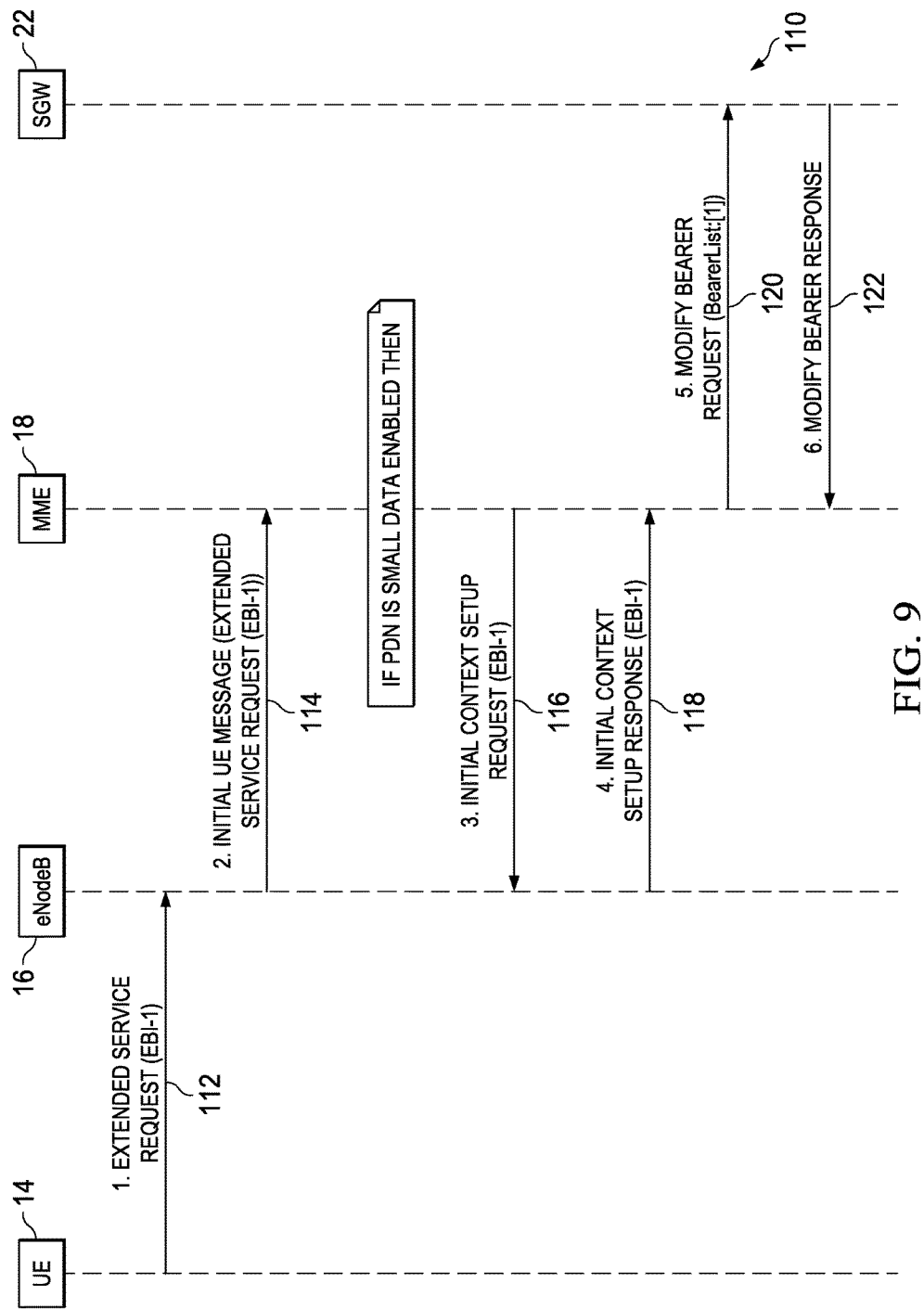
FIG. 9 is a simplified sequence diagram illustrating another example sequence of potential operations of an embodiment of the communication system.

FIG. 9 is a simplified sequence diagram illustrating an example operational sequence 110 for a mobile originated (MO) small data communication initiation process according to an embodiment of communication system 10 wherein UE 14 is in IDLE mode and sends small data in a default EPS bearer. When an IDLE mode UE 14 has small data to send, it may be assumed that the small data is associated with a particular EPS bearer (default or dedicated), and that the EPS bearer may be established apriori via normal signaling mechanisms. To transition from IDLE to CONNECTED mode and send small data, UE 14 can perform a Targeted Service Request procedure wherein the EBI of small data bearer(s) is included in an EXTENDED SERVICE REQUEST (EBI-1) at 112. In some embodiments where UE 14 may have multiple PDN connections to send different types of small data traffic, multiple EBI values may be included within the EXTENDED SERVICE REQUEST (e.g., EXTENDED SERVICE REQUEST (EBI-1, EBI-2, . . . ). In some embodiments, if UE 14 only has a single default PDN connection, UE 14 may choose to employ normal service request procedure or targeted service request procedure for MO small data communication. The outcome may be the same in both the normal service request procedure and the targeted service request procedure cases.

At 114, eNB 16 may forward the EXTENDED SERVICE REQUEST (EBI-1) received via 112 to MME 18 in an S1 INITIAL UE MESSAGE. The presence of EBI(s) can allow MME 18 to distinguish EXTENDED SERVICE REQUEST from a regular SERVICE REQUEST (without any EBIs) or EXTENDED SERVICE REQUEST for other purposes like Circuit Switched Fallback (CSFB), and take appropriate actions. MME 18 may check whether requested EBI(s) corresponds to a small data bearer as per the (E)MM context of UE 14. If the (E)MM context of UE 14 is not found, then per normal (e.g., typical, standard) system behavior, MME 18 may reject the request with appropriate cause code value. If the (E)MM context for UE 14 is found, and if UE 14 has indicated a desire to selectively activate an EBI that may or may not be non-small data capable, then depending on the operator policy for allowing selective establishment of non-small data bearers, for each EBI received, MME 18 may perform various suitable actions. If the EBI refers to the default EPS bearer of a particular PDN connection, then MME 18 may perform activation of just the EPS bearer associated with that EBI by sending an INITIAL CONTEXT SETUP REQUEST at 116 with E-UTRAN Radio Access Bearer (E-RAB) ID corresponding to the requested EBI. At 118, eNB 16 may respond with an INITIAL CONTEXT SETUP RESPONSE acknowledging setup of the E-RAB with the specified E-RAB ID, and providing its S1-U tunnel endpoint identifier(s) to the MME 18 (e.g., to be sent to SGW 22).

At 120, MME 18 may issue a MODIFY BEARER REQUEST towards SGW 22, with the message including the identified EBI(s), and S1-U tunnel endpoint identifier received in 118. SGW 22 may send a MODIFY BEARER REQUEST to a PGW (not shown), and upon receiving successful completion, may activate an S1-U bearer only for the identified EBI indicated by MME 18. In addition, SGW 22 may mark the identified EBI as ACTIVE in its EPS Bearer Context, and may mark any other EBI(s) associated with the PDN connection as INACTIVE. At 122, SGW may send a MODIFY BEARER RESPONSE to MME 18. MME 18 may mark the activated EBI as ACTIVE in its MM context, and may mark any other EBI(s) associated with the PDN connection as INACTIVE.

Upon successful completion of the Targeted Service Request as indicated herein, both UE 14 and MME 18 may transition UE 14 to ECM-CONNECTED according to existing service request procedures, and mark the identified EBI(s) as ACTIVE in a respective MM context. Normally, bearer synchronization between UE 14 and network 12 may occur at the end of extended service request procedure. However, in various embodiments, when Targeted Service Request procedure is in use, UE 14 may not deactivate EBI(s) for which it did not receive E-RAB(s) from eNB 16; UE 14 may simply mark any other EBI(s) as INACTIVE in its MM context. Any subsequent actions on either UE 14 or MME 18 may take into account the EPS Bearer status (e.g., ACTIVE/INACTIVE).

Figure 10:
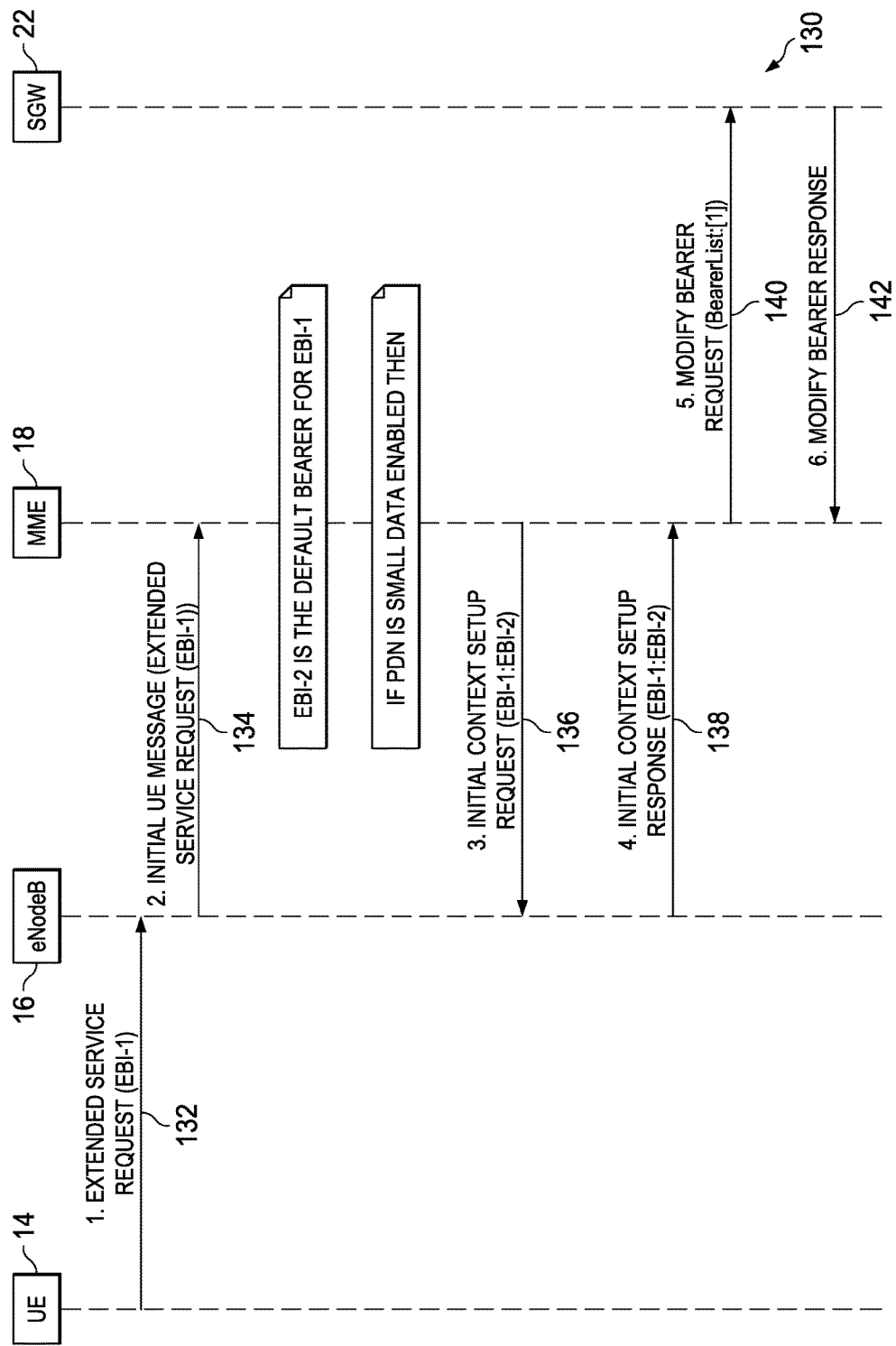
FIG. 10 is a simplified sequence diagram illustrating yet another example sequence of potential operations of an embodiment of the communication system.

FIG. 10 is a simplified sequence diagram illustrating an example operational sequence 130 for a mobile originated (MO) small data communication initiation process according to an embodiment of communication system 10 wherein UE 14 is in IDLE mode and sends small data in a dedicated EPS bearer. At 132, UE 14 may perform a Targeted Service Request procedure with an EXTENDED SERVICE REQUEST (EBI-1) including the EBI (e.g., EBI-1) of small data bearer(s). At 134, eNB 16 may forward the EXTENDED SERVICE REQUEST (EBI-1) to MME 18 in an INITIAL UE MESSAGE. If the EBI refers to a dedicated EPS bearer of the PDN connection (e.g., EBI-1 indicates the small data bearer, and EBI-2 indicates the default EPS bearer), MME 18 may activate both the default EPS bearer associated with the identified EBI (e.g., EBI-1) included in the Extended Service Request, along with the dedicated EPS bearer corresponding to the identified EBI by sending an INITIAL CONTEXT SETUP REQUEST at 136 with E-RAB ID corresponding to the requested EBIs (e.g., EBI-1, EBI-2). At 138, eNB 16 may respond with an INITIAL CONTEXT SETUP RESPONSE acknowledging setup of the E-RAB with the specified E-RAB ID.

At 140, MME 18 may issue a MODIFY BEARER REQUEST towards SGW 22, with the message including the identified EBI(s) (e.g., EBI-1, EBI-2). SGW 22 may send a MODIFY BEARER REQUEST to the PGW (not shown), and upon receiving successful completion, may activate an S1-U bearers for the identified EBIs indicated by MME 18. In addition, SGW 22 may mark the identified EBIs as ACTIVE in its EPS Bearer Context, and may mark any other EBI(s) associated with the PDN connection as INACTIVE. At 142, SGW may send a MODIFY BEARER RESPONSE to MME 18. MME 18 may mark the activated EBIs as ACTIVE in its MM context, and may mark any other EBI(s) associated with the PDN connection as INACTIVE.

Figure 11:
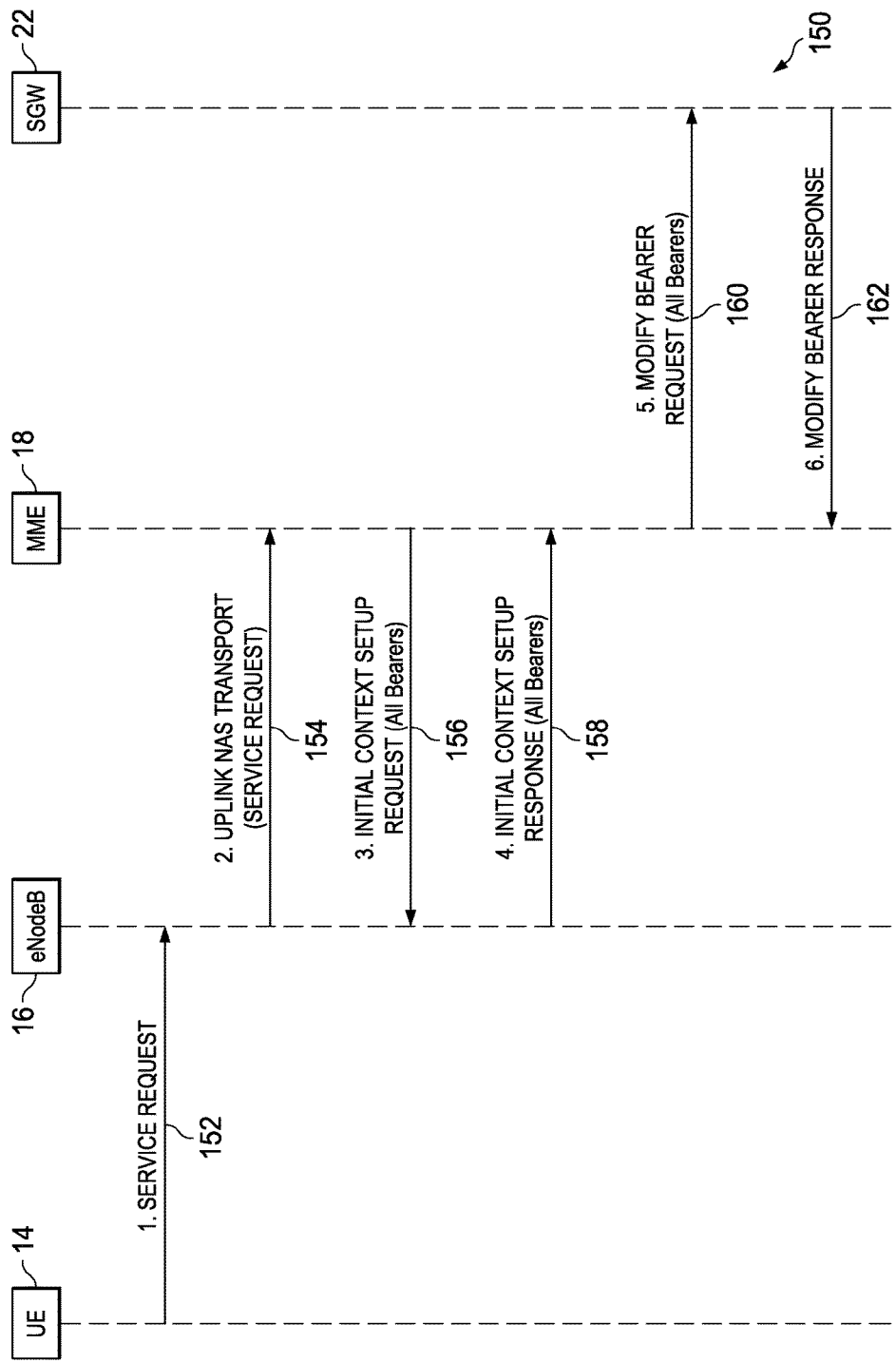
FIG. 11 is a simplified sequence diagram illustrating yet another example sequence of potential operations of an embodiment of the communication system.

FIG. 11 is a simplified sequence diagram illustrating an example operational sequence 150 for a mobile originated (MO) non-small data communication process according to an embodiment of communication system 10 wherein UE 14 has previously successfully completed the targeted service request for small data communication. In a ECM-CONNECTED mode, UE 14 may have non-small data to communicate on any one of the inactive EPS bearers. At 152, UE 14 may execute a normal (e.g., regular, according to current 3GPP standards) SERVICE REQUEST procedure (without including EBIs). At 154, eNB 16 may put the SERVICE REQUEST into an UPLINK NAS TRANSPORT message.

At 156, MME 18 may send an INITIAL CONTEXT SETUP REQUEST again with all EPS bearers stored in its MM context. At 158, eNB 16 may respond with an INITIAL CONTEXT SETUP RESPONSE by providing the same S1-U tunnel endpoint identifier(s) for previously activated E-RAB(s) and new S1-U tunnel endpoint identifier(s) for new E-RAB(s) indicated in the setup request. At 160, MME 18 may activate the remainder of EBI(s) by sending MODIFY BEARER REQUESTs for each of the remainder EBIs to SGW 22. At 162, upon successful processing of MODIFY BEARER REQUEST(s) towards PGW, SGW 22 may change corresponding EBI(s) from INACTIVE to ACTIVE state in its EPS Bearer Context. MME 18 may mark all EBI(s) as ACTIVE in its EMM Context.

Figure 12:
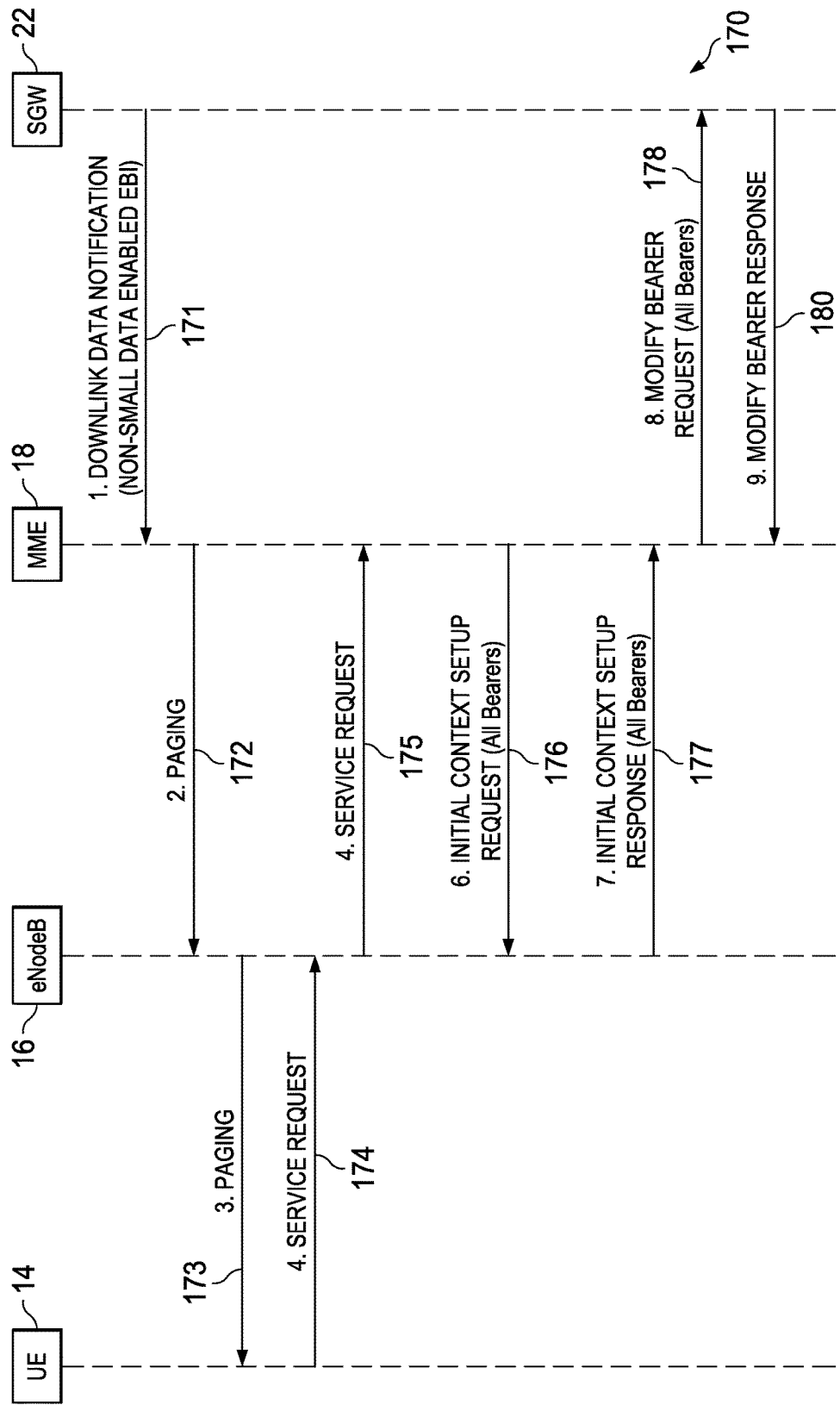
FIG. 12 is a simplified sequence diagram illustrating yet another example sequence of potential operations of an embodiment of the communication system.

FIG. 12 is a simplified sequence diagram illustrating an example operational sequence 170 for a mobile terminated (MT) non-small data communication process according to an embodiment of communication system 10 wherein UE 14 has previously successfully completed the targeted service request. In a ECM-CONNECTED mode, MME 18 may receive a DOWNLINK DATA NOTIFICATION message from SGW 22 communicating non-small data on any one of the inactive EPS bearers at 171. At 172, MME 18 may page eNB 16. At 173, eNB 16 may forward the paging to UE 14. At 174, UE 14 may send a SERVICE REQUEST to eNB 16, which may forward the service request to MME 18 at 175. At 176, MME 18 MME 18 may send an INITIAL CONTEXT SETUP REQUEST again with all EPS bearers stored in its MM context. At 177, eNB 16 may respond with an INITIAL CONTEXT SETUP RESPONSE by providing the same S1-U tunnel endpoint identifier(s) for previously activated E-RAB(s) and new S1-U tunnel endpoint identifier(s) for new E-RAB(s) indicated in the setup request. At 178, MME 18 may activate the remainder of EBI(s) by sending MODIFY BEARER REQUESTs for substantially all EBIs to SGW 22. At 180, upon successful processing of MODIFY BEARER REQUEST(s) towards PGW, SGW 22 may change corresponding EBI(s) from INACTIVE to ACTIVE state in its EPS Bearer Context. MME 18 may mark all EBI(s) as ACTIVE in its EMM Context.

Figure 13:
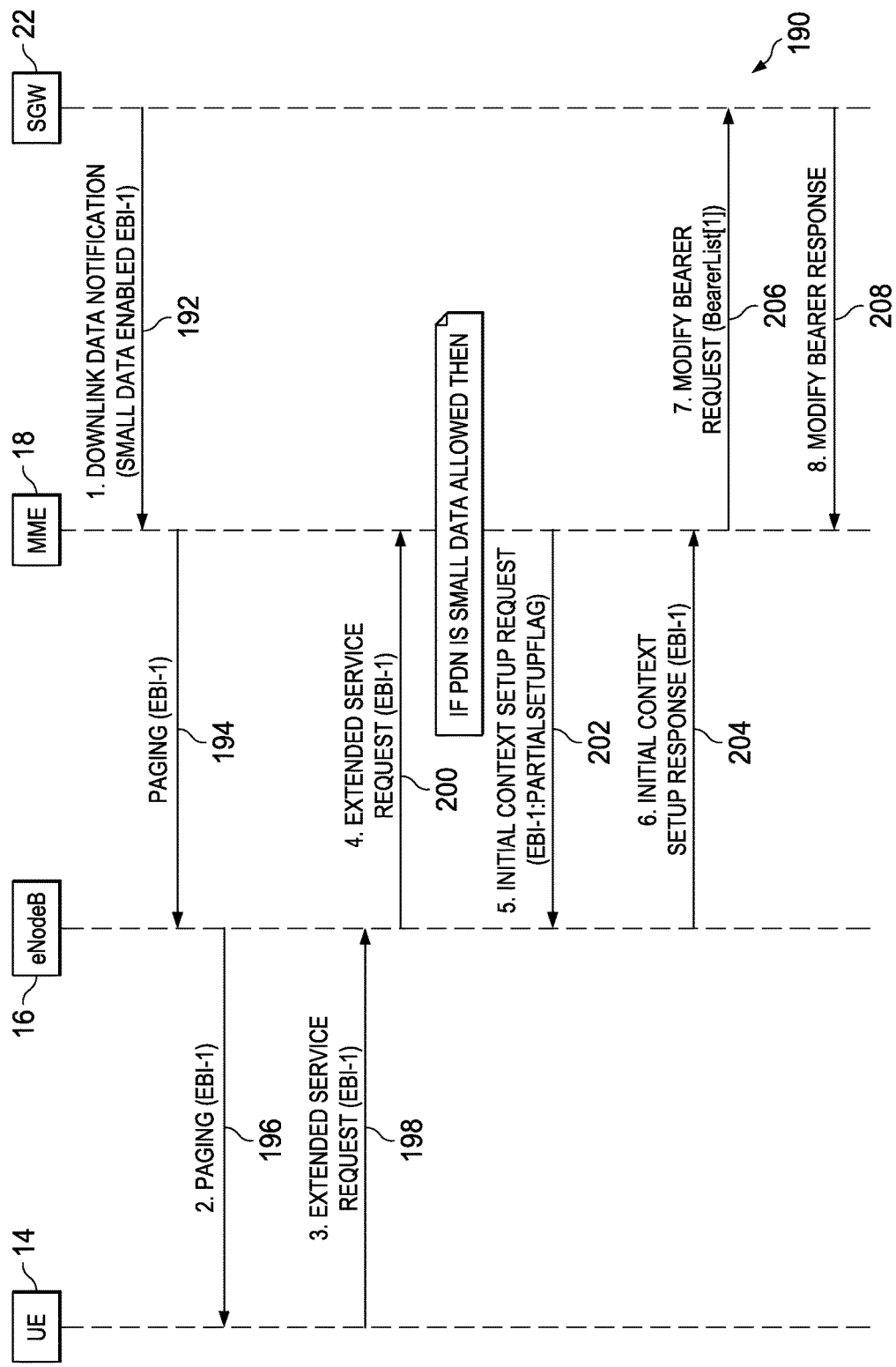
FIG. 13 is a simplified sequence diagram illustrating yet another example sequence of potential operations of an embodiment of the communication system.

FIG. 13 is a simplified sequence diagram illustrating an example operational sequence 190 for a mobile terminated (MT) small data communication process on a default EPS bearer according to an embodiment of communication system 10 wherein UE 14 has previously successfully completed the targeted service request. When the PGW receives small data destined for UE 14 in ECM-IDLE-mode in a downlink direction (e.g., MT communication), a network triggered service request procedure according to 3GPP standards (e.g., TR 23.401 clause 5.3.4.3) may be implemented. For example, the PGW may send the downlink data to SGW 22; SGW may send a downlink data notification to MME 18; MME 18 may page eNB 16, which may in turn page UE 14.

If the PGW receives small data for UE 14 that has transitioned to ECM-CONNECTED state through a Targeted Service Request procedure, small data may be delivered to UE 14 according to the already established user plane connections. If the PGW receives non-small data destined for UE 14 that has transitioned to ECM-CONNECTED state, both PGW and SGW may respond according to 3GPP standards (e.g., TR 23.401 clause 5.3.4.3, steps 1 and 2). For example, SGW 22 may receive a downlink data packet for UE 14, for which the SGW context data indicates no downlink previous user plane connections. SGW 22 may buffer the downlink data packet and identify appropriate MME 18 serving UE 14. SGW 22 may sends a Downlink Data Notification message to MME 18 for which it has control plane connectivity for UE 14. MME 18 may respond to SGW 22 with a Downlink Data Notification Acknowledgement message. Moreover, SGW 22 may not downlink user plane connections for INACTIVE bearers (e.g., EPS bearers having an INACTIVE status in its EPS or MM context).

Upon receiving the downlink data notification (DDN) for a small data bearer (e.g., EBI-1 configured and enabled to communicate small data) at 192, MME 18 may page UE 14, through eNB 16 at 194. The PAGING message may be enhanced to include EBI-1 associated with the small data bearer. eNB 16 may forward the PAGING message to UE 14 at 196. UE 14 may respond with an EXTENDED SERVICE REQUEST including EBI-1 at 198. In some embodiments, if UE 14 has a single default PDN connection, MME 18 may perform normal paging request per existing 3GPP TR 23.401 standard procedures. In some embodiments, if a radio layer 2 (RAN2) determines that extending the PAGING message with EBI-1 is not feasible, the PAGING message can simply include a differentiating indicator (e.g., 1-bit) to force UE 14 to perform extended service request instead of service request when paged.

At 200, eNB 16 may send the EXTENDED SERVICE REQUEST to MME 18 (e.g., through an INITIAL UE MESSAGE over an S1 interface). MME 18 may be aware of EBI-1 on which it received the DDN. If EBI-1 is small data enabled, MME 18 may activate only EBI-1 (e.g., similar to the MO-case). UE 14, eNB 16, MME 18, and SGW 22 may proceed to activate the appropriate bearer corresponding to default EBI-1 as indicated in the MO-case. For example, at 202, MME 18 may send an INITIAL CONTEXT SETUP REQUEST to eNB 16 including the small data bearer EBI-1. A partialSetupFlag may indicate to UE 14 that other EPS bearers are not setup intentionally (e.g., not an error). The partialSetupFlag can allows UE 14 to maintain undeleted EPS bearers other than the ones for small data communication. To explain further, assume merely for the sake of illustration and not as a limitation, that UE 14 has more than one PDN context. As per current standards, if UE 14 sends a SERVICE REQUEST, and only one PDN's bearers are activated (and set up), UE 14 may locally delete all the other PDNs (and associated bearers). Now, assume merely for the sake of illustration and not as a limitation, that UE 14 has one PDN with more than one bearer. If, during the SERVICE REQUEST procedure, MME 18 responds with a subset of bearers for the PDN, UE 14 may locally delete all other bearers according to current standards. Thus, the partialSetupFlag may be set appropriately to indicate that UE 14 need not delete EPS bearers other than small data bearers. At 204, eNB 16 may respond with an INITIAL CONTEXT SETUP RESPONSE. At 206, MME 18 may send a MODIFY BEARER request to SGW 22 indicating the default bearer EBI-1. At 208, SGW 22 may respond with a MODIFY BEARER response appropriately, activating the default bearer as small data bearer 48.

Figure 14:
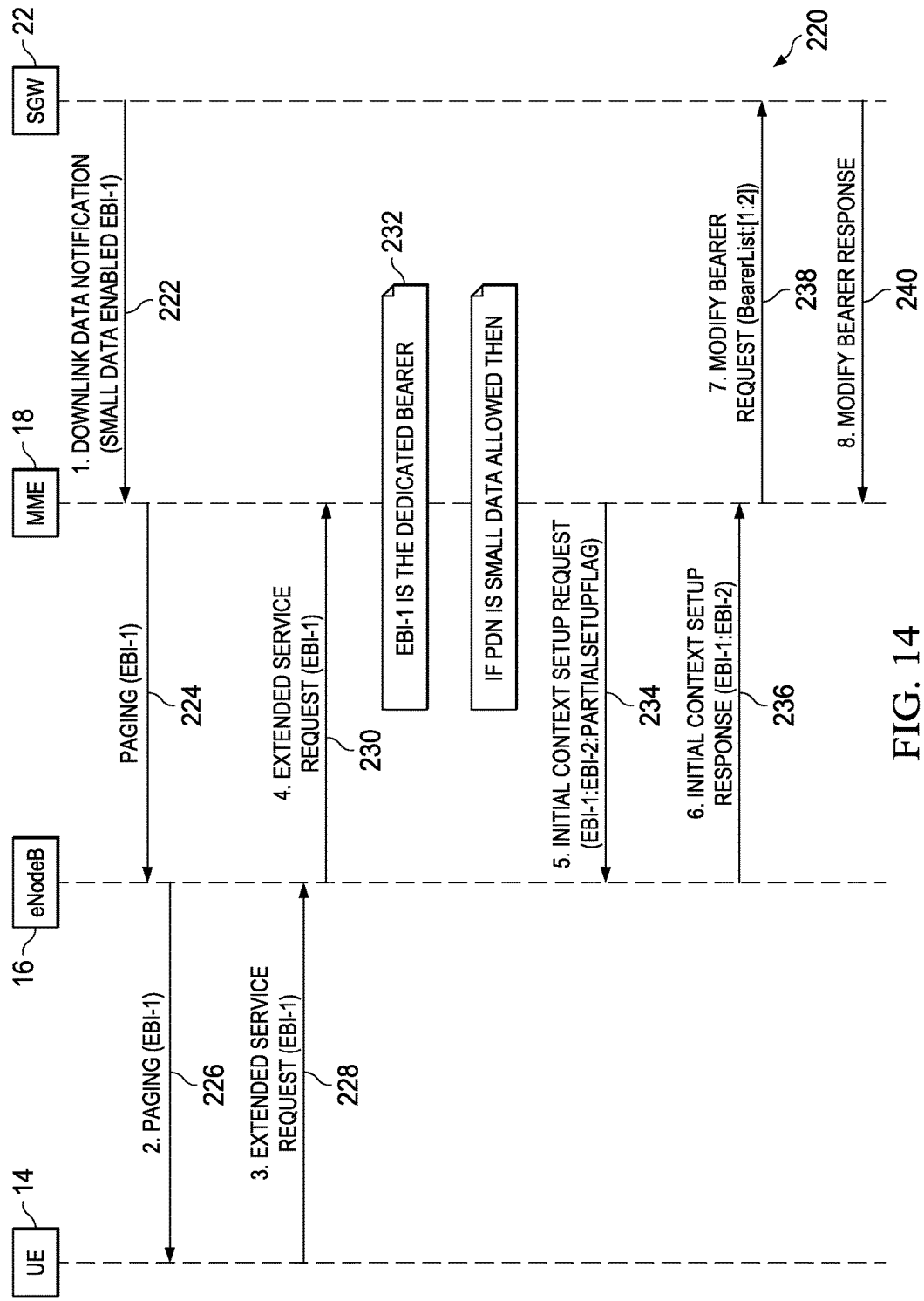
FIG. 14 is a simplified sequence diagram illustrating yet another example sequence of potential operations of an embodiment of the communication system.

FIG. 14 is a simplified sequence diagram illustrating an example operational sequence 220 for a mobile terminated (MT) small data communication process on a dedicated EPS bearer according to an embodiment of communication system 10 wherein UE 14 has previously successfully completed the targeted service request. Upon receiving the downlink data notification (DDN) for a small data bearer (e.g., EBI-1 configured and enabled to communicate small data) at 222, MME 18 may page UE 14, through eNB 16 at 224. The PAGING message may be enhanced to include EBI-1 associated with the small data bearer. eNB 16 may forward the PAGING message to UE 14 at 226. UE 14 may respond with an EXTENDED SERVICE REQUEST including EBI-1 at 228. At 230, eNB 16 may send the EXTENDED SERVICE REQUEST to MME 18 through an INITIAL UE MESSAGE over an S1 interface. MME 18 may determine that EBI-2 (and not EBI-1) is the default EPS bearer for the PDN connection at 232. If the PDN is small data allowed, then at 234, MME 18 may activate both EBI-1 and EB-2 (e.g., similar to the MO-case). UE 14, eNB 16, MME 18, and SGW 22 may proceed to activate appropriate bearers corresponding to default EBI-2 and small data EBI-1 as indicated in the MO-case. For example, at 234, MME 18 may send an initial context setup request to eNB 16 including the small data bearer EBI-1 and dedicated EPS bearer EBI-2 (but not any other EPS bearers). At 236, eNB 16 may respond with an initial context setup response. At 238, MME 18 may send a MODIFY BEARER request to SGW 22 indicating the small data bearer EBI-1 and default EPS bearer EBI-2. At 240, SGW 22 may respond with a MODIFY BEARER response appropriately, activating the dedicated bearer EBI-1 as small data bearer 48.

Figure 15:
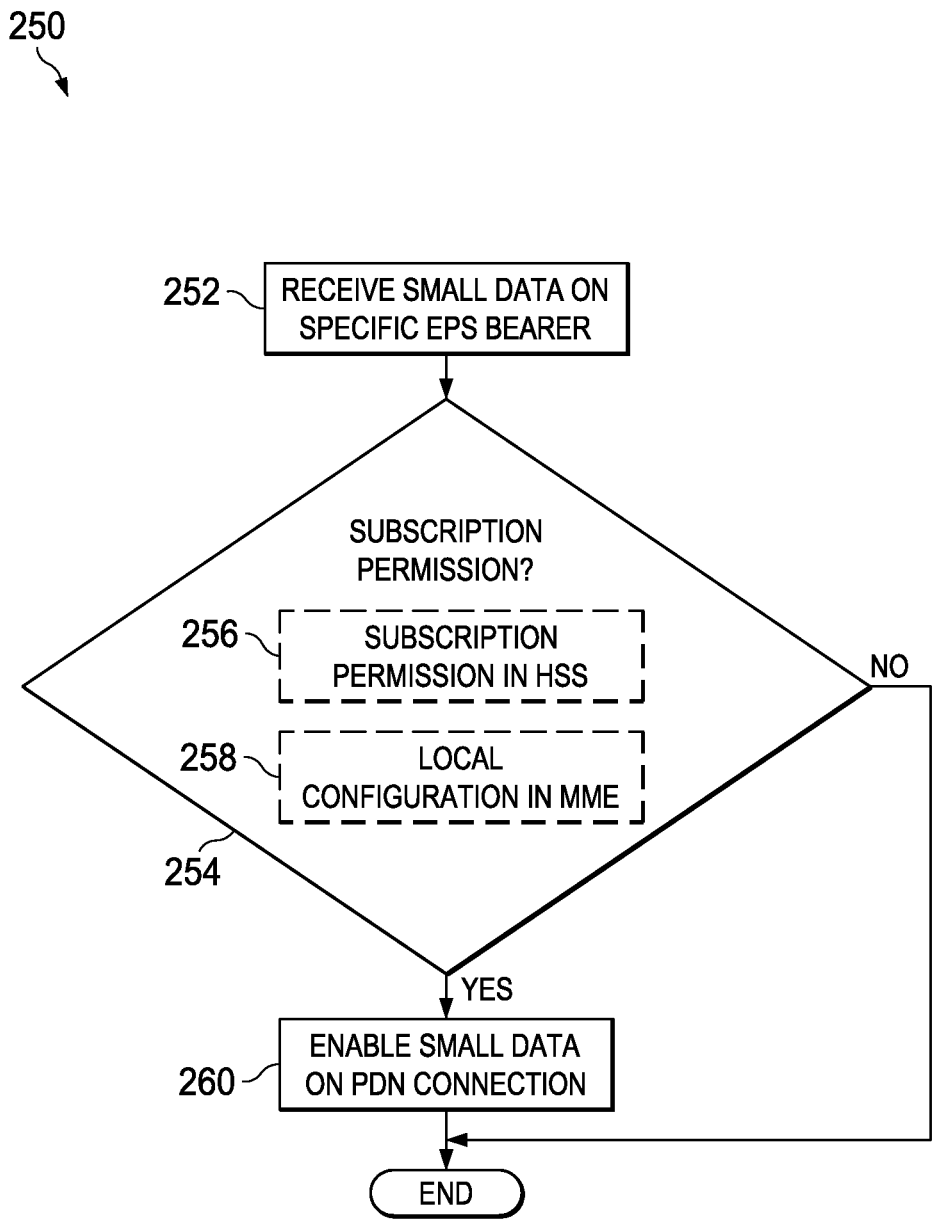
FIG. 15 is a simplified flow diagram illustrating example operations that may be associated with an embodiment of the communication system.

FIG. 15 is a simplified flow diagram illustrating example operations 250 that may be associated with embodiments of communication system 10. At 252, MME 18 may receive an ATTACH REQUEST or TRACKING AREA UPDATE REQUEST with small data support indicator indicating to the MME 18 that UE 14 supports Targeted Service Request procedure. At 254, MME 18 may determine whether the specific EPS bearer (and corresponding PDN connection) has small bearer subscription permission (e.g., whether the specific EPS bearer or corresponding PDN connection is enabled to carry small data). The determination may be informed by at least two alternatives: (1) at 256, subscription permission may be determined from data in HSS 20 based on a per-IMSI or per IMSI and per-APN basis; or (2) local configuration in MME 18 may indicate subscription permission at 258. If subscription permission is available, at 260, MME 18 may enable small data on the PDN connection. If not, the operations may end thereupon.

Figure 16:
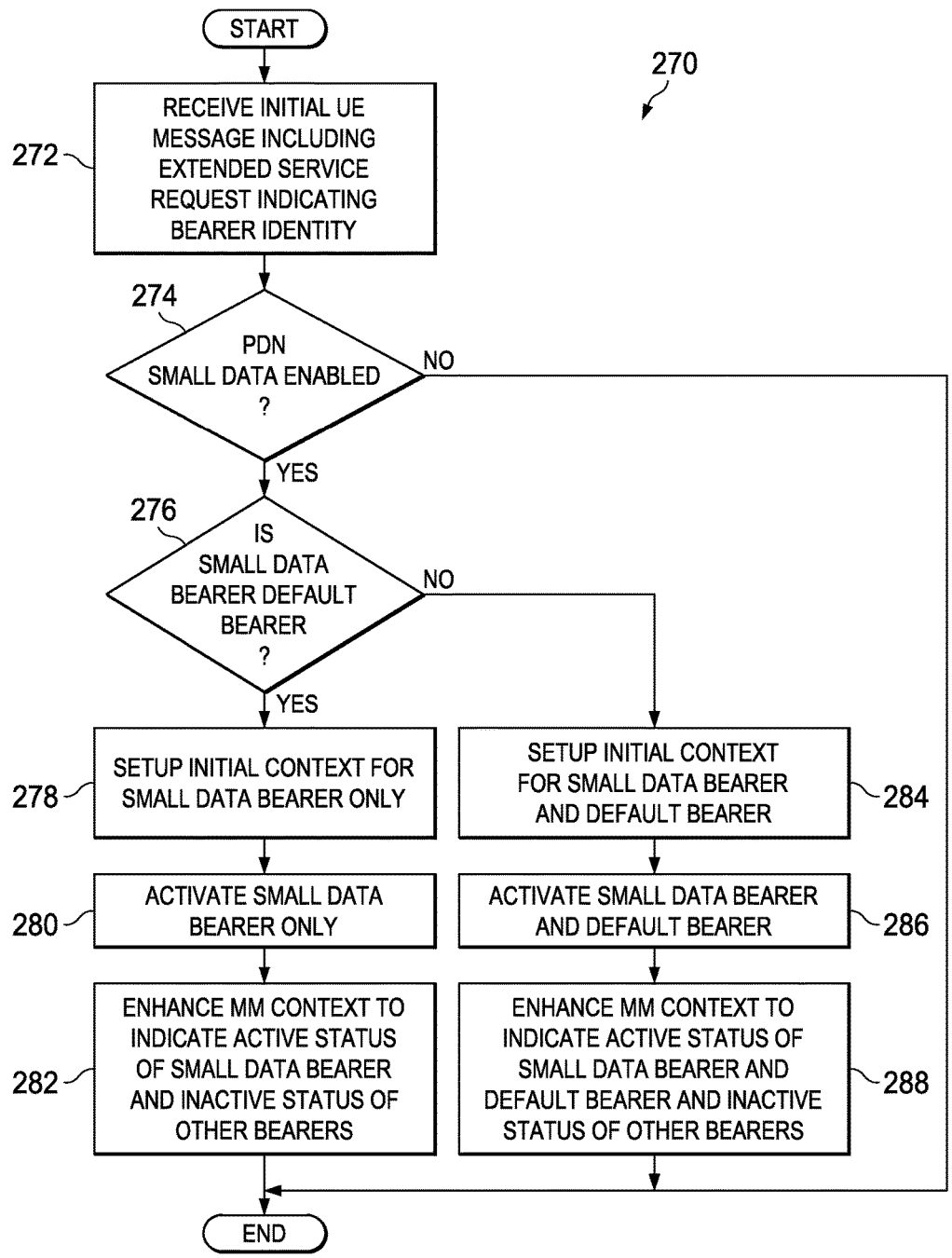
FIG. 16 is a simplified flow diagram illustrating other example operations that may be associated with an embodiment of the communication system.

FIG. 16 is a simplified flow diagram illustrating example operations 270 that may be associated with embodiments of communication system 10. At 272, MME 18 may receive an INITIAL UE message from eNB 16, wherein the INITIAL UE message includes an extended service request indicating the EPS bearer identity (e.g., EBI-1) for small data bearer 48. At 274, a determination may be made whether the PDN connection is small data enabled. If not, the operations may end thereupon. If small data is enabled, at 276, a determination may be made if small data bearer 48 is the default EPS bearer for the PDN connection. If small data bearer 48 is the default EPS bearer, at 278, MME 18 may set up initial context for small data bearer 48 only (to the exclusion of substantially any other EPS bearer in the PDN connection). At 280, small data bearer 48 alone may be activated. At 282, the MM context associated with small data bearer 48 may be enhanced to indicate an ACTIVE status of small data bearer 48 and INACTIVE status of any other EPS bearer on the PDN connection.

Turning back to 276, if small data bearer 48 is not the default EPS bearer, and one or more dedicated EPS bearers are available in the PDN connection and small data bearer 48 is one of the one or more dedicated EPS bearers, MME 18 may set up initial context for small data bearer 48 and the default EPS bearer (to the exclusion of other dedicated EPS bearers in the PDN connection) at 284. At 286, MME 18 may activate small data bearer 48 and the default EPS bearer. At 288, MME 18 may enhance the MM context to indicate an ACTIVE status for both small data bearer and the default EPS bearer, and an INACTIVE status for substantially all other dedicated EPS bearers.

Figure 17:
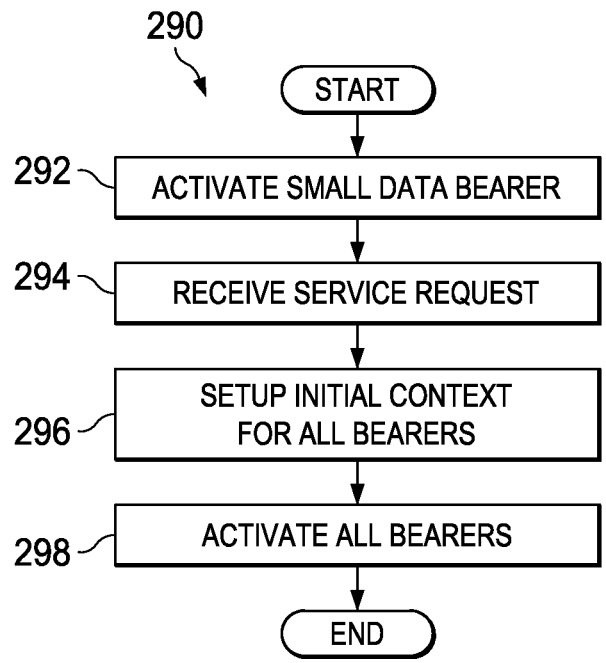
FIG. 17 is a simplified flow diagram illustrating yet other example operations that may be associated with an embodiment of the communication system.

FIG. 17 is a simplified flow diagram illustrating example operations 290 that may be associated with embodiments of communication system 10. At 292, MME 18 may activate small data bearer(s) 48. At 294, MME 18 may receive a normal (e.g., not targeted) service request from UE 14 (through eNB 16) indicating its desire transition all bearer(s) to ACTIVE state. At 296, MME 18 may set up initial context for substantially all EPS bearers on the PDN connection(s). At 298, MME 18 may activate substantially all EPS bearers.

Figure 18:
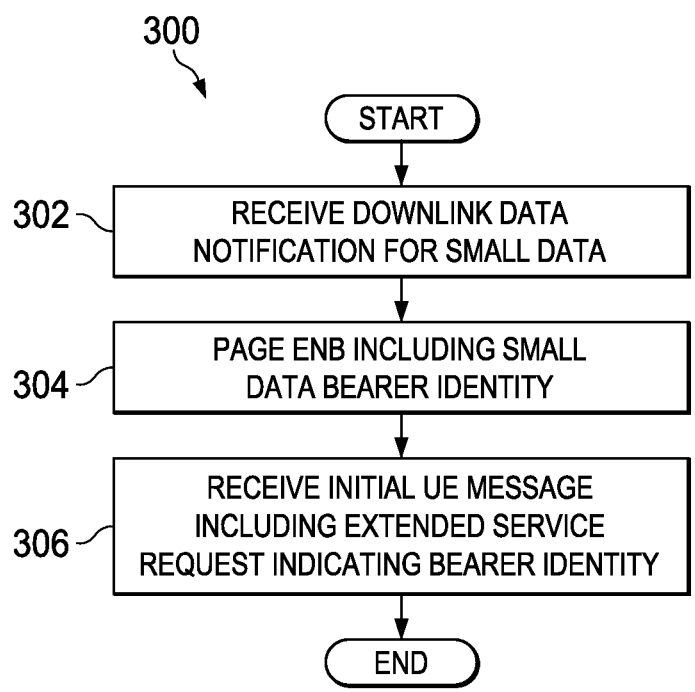
FIG. 18 is a simplified flow diagram illustrating yet other example operations that may be associated with an embodiment of the communication system.

FIG. 18 is a simplified flow diagram illustrating example operations 300 that may be associated with MT communication for small data according to embodiments of communication system 10. At 302, MME 18 may receive downlink data notification for small data indicating the small data bearer identity. At 304, MME 18 may page eNB 16 including the small data bearer identity. At 306, MME 18 may receive an initial UE message from eNB 16 including an extended service request indicating the small data bearer identity. Thereupon, operations may proceed according to the operations indicated in FIG. 16.

Note that in this Specification, references to various features (e.g., elements, structures, modules, components, steps, operations, functions, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments. As used herein, an "application" can be inclusive of any executable file comprising instructions that can be understood and processed on a computer system, and may further include library modules loaded during execution, object files, system files, hardware logic, software logic, or any other executable modules. The application can include user space applications and kernel applications.

In example embodiments, at least some portions of the activities outlined herein may be implemented in software in, for example, UE 14, eNB 16, MME 18, HSS 20, and SGW 22 (among other network elements). In some embodiments, one or more of these features may be implemented in hardware, provided external to these elements, or consolidated in any appropriate manner to achieve the intended functionality. The various network elements (e.g., UE 14, eNB 16, MME 18, HSS 20, and SGW 22) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the various small data modules (e.g., MME small data module 28, SGW small data module 30, HSS small data module 32, E-UTRAN small data module 34, UE small data module 36) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 60, 64, 70, 74, 78) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processors 58, 62, 68, 72, 76) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a mobility management entity (MME) in a wireless network, an extended service request from a user equipment (UE), wherein the extended service request includes an evolved packet system (EPS) bearer identity (EBI) of an EPS bearer configured for small data communication over a packet data network (PDN) connection comprising one or more EPS bearer, wherein the one or more EPS bearer includes at least one small data bearer configured for the small data communication, wherein the small data communication comprises communication of packets smaller than 1000 bytes in size per communication session or alternatively, packets of any size communicated infrequently for a short duration of time, wherein the EBI comprises a one-half octet component of an EPS header of the EPS bearer;
   selectively activating only the small data bearer, comprising setting an EPS bearer context in a mobility management (MM) context of the small data bearer to active status, and setting the EPS bearer context in the MM context of other EPS bearers to inactive status;
   facilitating the small data communication;
   determining whether the small data communication is allowed;
   enabling the small data communication on the PDN connection;
   receiving a service request for non-small data communication; and
   activating all EPS bearers;
   wherein determining whether the small data communication is allowed comprises using subscription permission on a home subscriber server (HSS) database on a per-access point name (APN) basis and a per-International Mobile Subscriber Identity (IMSI) basis.

2. The method of claim 1, wherein the one or more EPS bearers includes a default EPS bearer and one or more dedicated EPS bearers, wherein the small data bearer is the default EPS bearer.

3. The method of claim 1, wherein the one or more EPS bearers includes a default EPS bearer and one or more dedicated EPS bearers, wherein the small data bearer is one of the dedicated EPS bearers, wherein the method further comprises activating the default EPS bearer.

4. The method of claim 1, wherein determining whether the small data communication is allowed comprises using subscription permission in a local configuration of the MME.

5. The method of claim 1, further comprising:
receiving downlink data notification indicating the EBI; and
transmitting a paging message to an Evolved Universal Terrestrial Radio Access Network (E-UTRAN) nodeB (eNB), wherein the paging message includes the EBI.

6. The method of claim 1, wherein the selectively activating only the small data bearer comprises:
setting up the mobility management (MM) context for the EBI; and
modifying a bearer request to include only the small data bearer.

7. The method of claim 6, further comprising:
enhancing the MM context to include an active or inactive status of the EBI.

8. One or more non-transitory tangible media encoding logic that includes instructions for execution and when executed by a processor of a mobility management entity (MME) in a wireless network, is operable to perform operations comprising:
receiving, at the MME, an extended service request from a user equipment (UE), wherein the extended service request includes an evolved packet system (EPS) bearer identity (EBI) of an EPS bearer configured for small data communication over a packet data network (PDN) connection comprising one or more EPS bearer, wherein the one or more EPS bearer includes at least one small data bearer configured for the small data communication, wherein the small data communication comprises communication of packets smaller than 1000 bytes in size per communication session or alternatively, packets of any size communicated infrequently for a short duration of time, wherein the EBI comprises a one-half octet component of an EPS header of the EPS bearer;
selectively activating only the small data bearer, comprising setting an EPS bearer context in a mobility management (MM) context of the small data bearer to active status, and setting the EPS bearer context in the MM context of other EPS bearers to inactive status;
facilitating the small data communication;
determining whether the small data communication is allowed;
enabling the small data communication on the PDN connection;
receiving a service request for non-small data communication; and
activating all EPS bearers;
wherein determining whether the small data communication is allowed comprises using subscription permission on a home subscriber server (HSS) database on a per-access point name (APN) basis and a per-International Mobile Subscriber Identity (IMSI) basis.

9. The media of claim 8, wherein the one or more EPS bearers includes a default EPS bearer and one or more dedicated EPS bearers, wherein the small data bearer is the default EPS bearer.

10. The media of claim 8, wherein the one or more EPS bearers includes a default EPS bearer and one or more dedicated EPS bearers, wherein the small data bearer is one of the dedicated EPS bearers, wherein the operations further comprise activating the default EPS bearer.

11. The media of claim 8, wherein the operations further comprise:
receiving downlink data notification indicating the EBI; and
transmitting a paging message to an eNB, wherein the paging message includes the EBI.

12. An apparatus, comprising:
a mobility management entity (MME) small data module;
a memory element for storing data; and
a processor that executes instructions associated with the data, wherein the processor and the memory element cooperate such that the apparatus is configured for:
receiving, at the MME small data module, an extended service request from a user equipment (UE), wherein the service request includes an evolved packet system (EPS) bearer identity (EBI) of an EPS bearer configured for small data communication over a packet data network (PDN) connection comprising one or more EPS bearers, wherein the one or more EPS bearers includes at least one small data bearer configured for the small data communication, wherein the small data communication comprises communication of packets smaller than 1000 bytes in size per communication session or alternatively, packets of any size communicated infrequently for a short duration of time, wherein the EBI comprises a one-half octet component of an EPS header of the EPS bearer;
selectively activating only the small data bearer, comprising setting an EPS bearer context in a mobility management (MM) context of the small data bearer to active status, and setting the EPS bearer context in the MM context of other EPS bearers to inactive status;
communicating the small data enablement to the UE;
facilitating the small data communication;
determining whether the small data communication is allowed;
enabling the small data communication on the PDN connection;
receiving a service request for non-small data communication; and
activating all EPS bearers;
wherein determining whether the small data communication is allowed comprises using subscription permission in a home subscriber server (HSS) database on a per-access point name (APN) basis and a per-International Mobile Subscriber Identity (IMSI) basis.

13. The apparatus of claim 12, wherein the one or more EPS bearers includes a default EPS bearer and one or more dedicated EPS bearers, wherein the small data bearer is the default EPS bearer.

14. The apparatus of claim 12, wherein the one or more EPS bearers includes a default EPS bearer and one or more dedicated EPS bearers, wherein the small data bearer is one of the dedicated EPS bearers, wherein the apparatus is further configured for activating the default EPS bearer.

15. The apparatus of claim 12, further configured for:
receiving downlink data notification indicating the EBI; and
transmitting a paging message to an eNB, wherein the paging message includes the EBI.

* * * * *